No. 629,169. Patented July 18, 1899.
W. N. PARKES.
SEWING MACHINE.
(Application filed June 14, 1897.)

(No Model.) 5 Sheets—Sheet 1.

WITNESSES:
L. N. Legendre
Ewa Eisenbraun

INVENTOR:
William N. Parkes,
BY
A Faber du Faur
ATTORNEY

No. 629,169. Patented July 18, 1899.
W. N. PARKES.
SEWING MACHINE.
(Application filed June 14, 1897.)
(No Model.) 5 Sheets—Sheet 2.
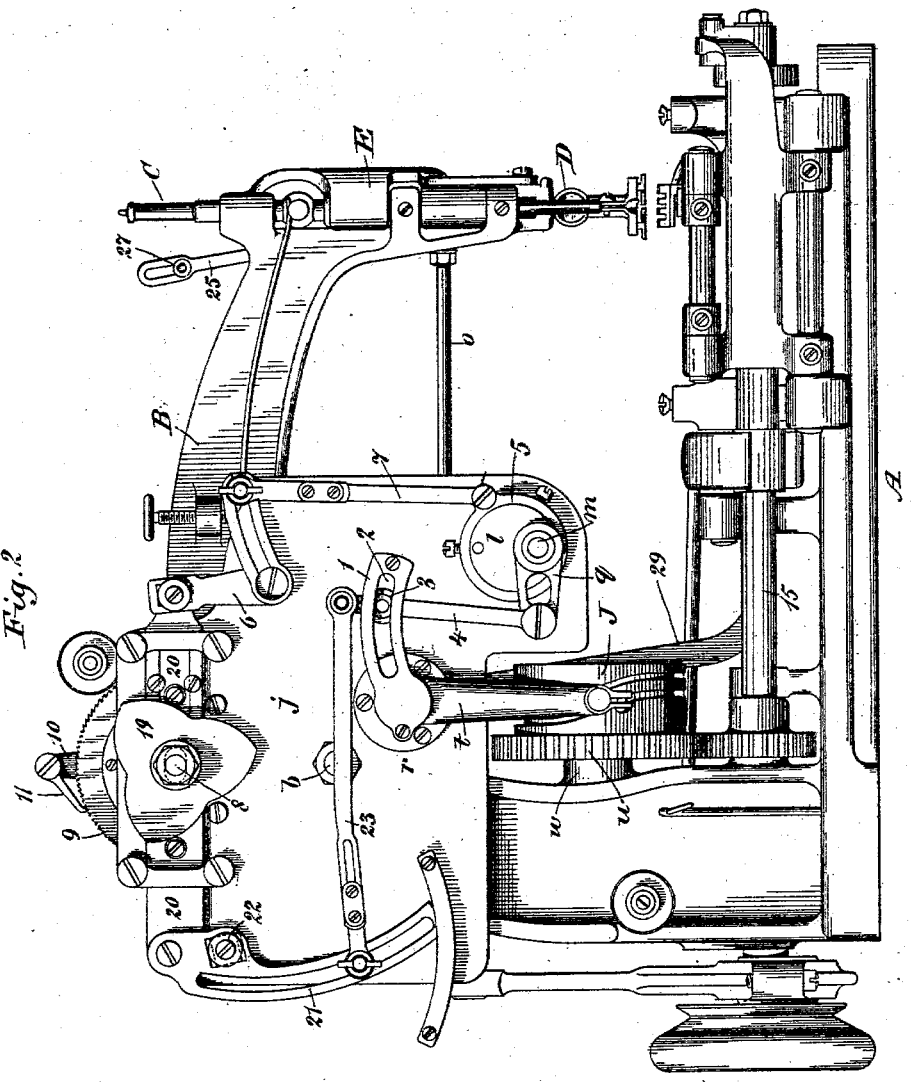
WITNESSES:
L. N. Legendre
GWA Eisenbraun
INVENTOR:
William N. Parkes
BY
Asher du Faur
ATTORNEY No. 629,169. Patented July 18, 1899.
W. N. PARKES.
SEWING MACHINE.
(Application filed June 14, 1897.)
(No Model.) 5 Sheets—Sheet 3.

WITNESSES:
L. N. Legendre
G. W. Eisenbraun

INVENTOR:
William N. Parkes,
BY
Alexander du Bois
ATTORNEY

No. 629,169. Patented July 18, 1899.
W. N. PARKES.
SEWING MACHINE.
(Application filed June 14, 1897.)
(No Model.) 5 Sheets—Sheet 4.
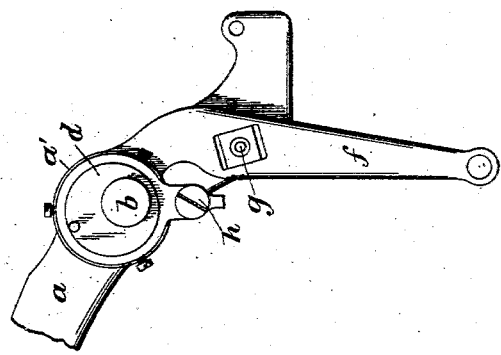
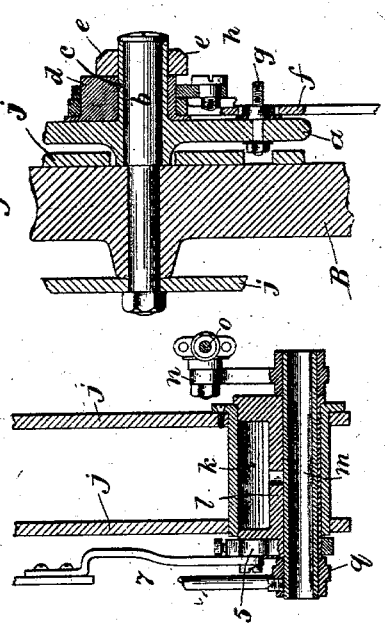
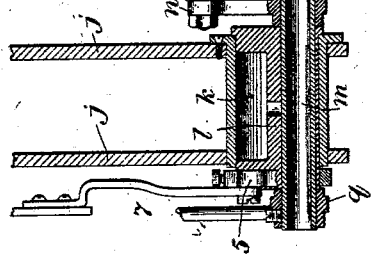
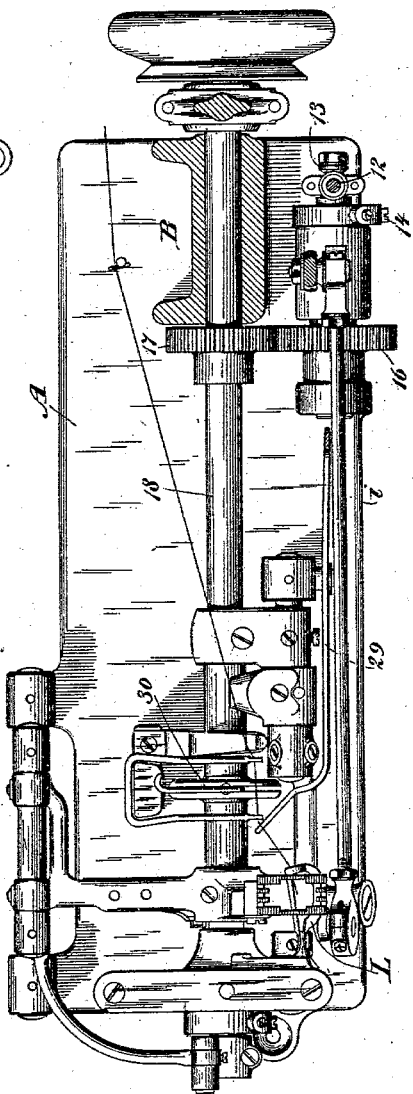
WITNESSES:
L. N. Legendre
INVENTOR:
William N. Parkes,
BY
ATTORNEY
THE NORRIS PETERS CO., PHOTO-LITHO., WASHINGTON, D. C.

No. 629,169. Patented July 18, 1899.
W. N. PARKES.
SEWING MACHINE.
(Application filed June 14, 1897.)
(No Model.) 5 Sheets—Sheet 5.
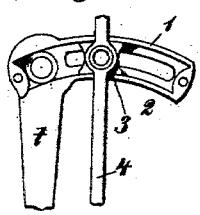
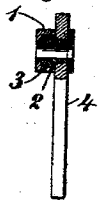
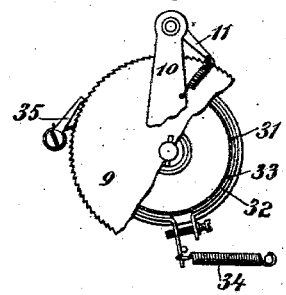
WITNESSES:
L. N. Legendre
G. W. A. Eisenbraun
INVENTOR:
William N. Parkes
BY
A. Faberduhay
ATTORNEY

UNITED STATES PATENT OFFICE.

WILLIAM N. PARKES, OF NEW YORK, N. Y.

SEWING-MACHINE.

SPECIFICATION forming part of Letters Patent No. 629,169, dated July 18, 1899.

Application filed June 14, 1897. Serial No. 640,605. (No model.)

*To all whom it may concern:*

Be it known that I, WILLIAM N. PARKES, a citizen of the United States of America, and a resident of New York, (Brooklyn,) in the county of Kings and State of New York, have invented certain new and useful Improvements in Sewing-Machines, of which the following is a specification.

My invention relates to that class of sewing-machines in which a vertically-reciprocating needle is vibrated laterally, but is more particularly related to my invention in this class of machines as described in my prior patent, dated September 14, 1897, No. 589,979, in which machine the working position of vibration of the needle is automatically moved laterally.

The main object of my present invention is to move laterally the working position of the needle-loop-engaging device in unison with the lateral vibrations and also in unison with the lateral changes of the working position of lateral vibration of the needle, so that the relative position of the needle and the engaging point of the needle-thread-loop-engaging device will be the same at their points of loop engagement.

The nature of my invention will best be understood when described in connection with the accompanying drawings, in which—

Figure 1:
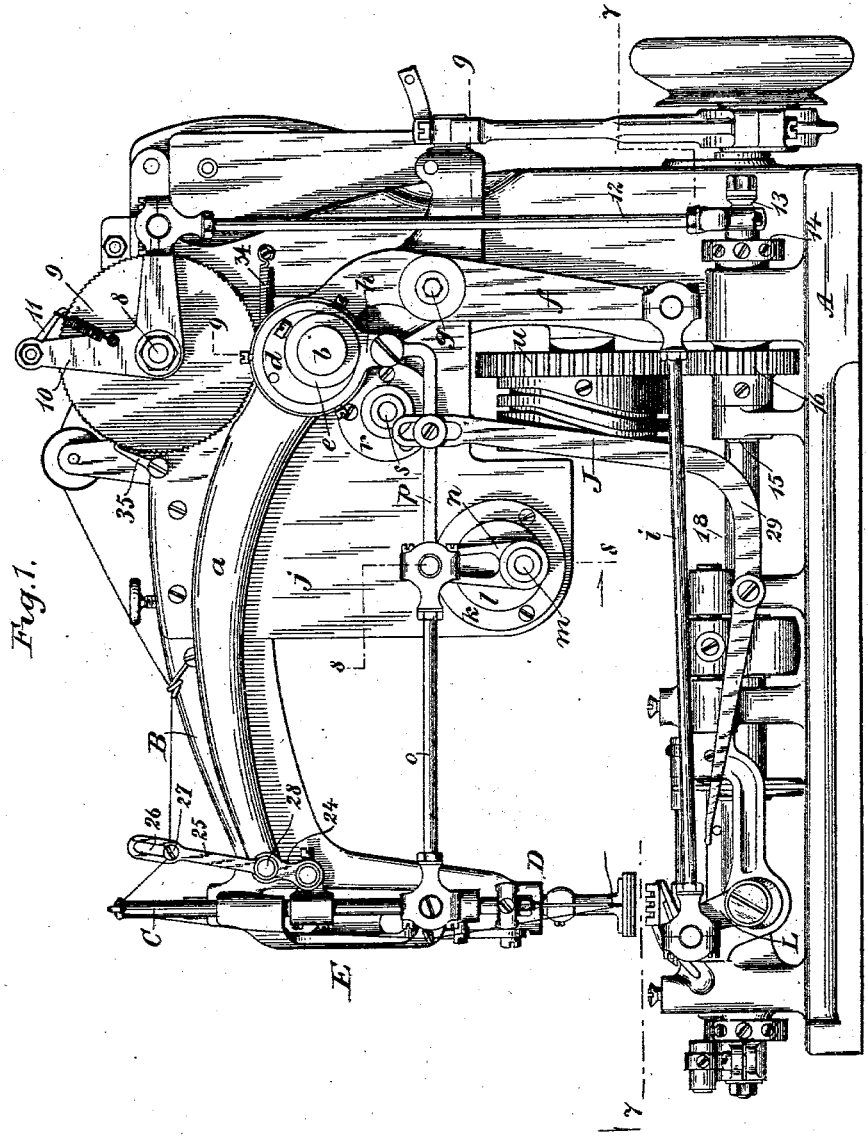
Figure 4:
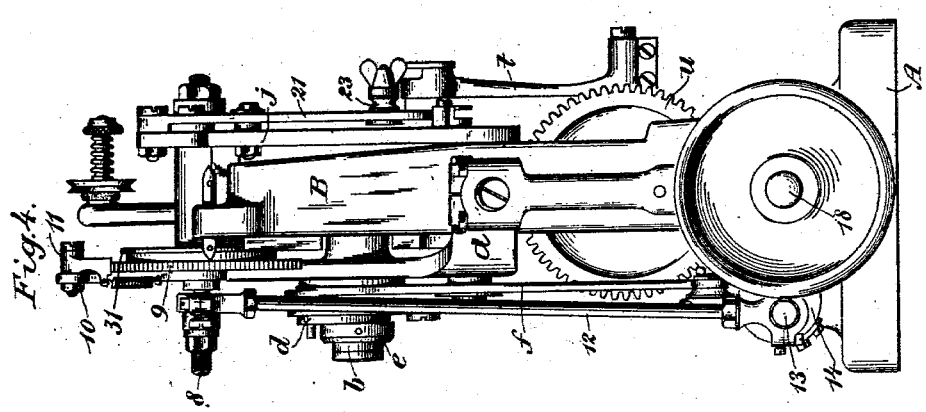
Figure 3:
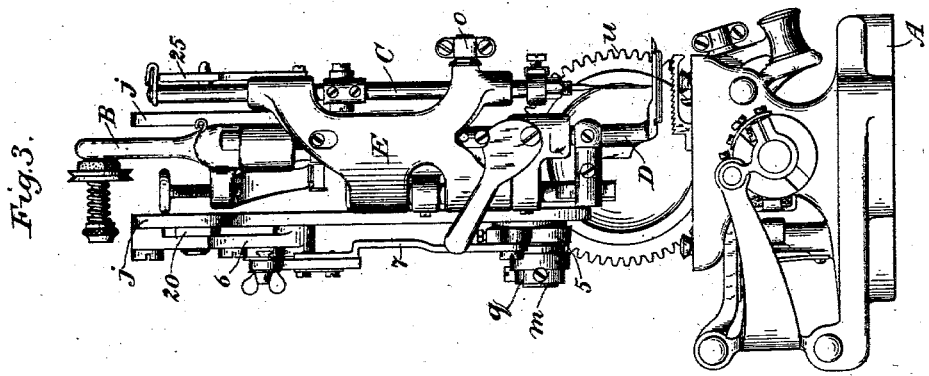
Figure 5:
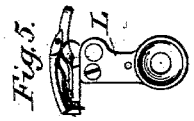
Figure 6:

Figure 1 represents a front elevation of a sewing-machine embodying my invention, the usual bed or cloth-plate and needle-plate being omitted. Fig. 2 is a rear elevation of the same. Figs. 3 and 4 are end views. Fig. 5 is a face view of the looper and looper-carrier. Fig. 6 is a top view thereof. Fig. 7 is a horizontal section on the line 7 7, Fig. 1. Fig. 8 is a section on the line 8 8, Fig. 1. Fig. 9 is a section on the line 9 9, Fig. 1. Fig. 10 is a front elevation of the lever for actuating the looper mechanism. Figs. 11 and 12 are detail views illustrating the construction of the lever for vibrating the needle-bar laterally. Fig. 13 is a face view, part being broken away and illustrating the construction of the frictional retarding device for the ratchet-wheel.

Similar letters and numerals of reference designate corresponding parts throughout the several views of the drawings.

In the present example I have illustrated the several improvements applied to a Union Special zigzag or overseaming machine; but of course they may be applied to other machines.

Referring now to the drawings, the letter A designates the base of the machine; B, the gooseneck; C, the needle-bar; D, the presser-bar, and E the needle-bar gate or frame, all being of a usual construction. In the usual zigzag-machine the needle-bar is vibrated laterally through a segment-lever actuated by a cam and a link connection between the said segment-lever and the needle-bar or needle-bar gate or frame. As the needle is vibrated laterally, it is well understood that the point of loop engagement between the needle and the needle complemental stitch-forming mechanism is not uniform, and the greater the extent of the lateral action of the needle the more the relation between the needle and its complemental stitch-forming mechanism is changed with respect to their points of loop engagement. In my patent dated October 12, 1897, No. 591,634, I provide a mechanism for vibrating laterally the working position of the needle-thread-loop-engaging device, so as to keep the relation between it and the laterally-vibrating needle the same at their points of loop engagement. In this machine I adjust the mechanism to change the extent of the lateral vibration of the needle in the usual manner, and then to have the point of the working position of the looper change to the same extent I adjust the mechanism provided for this purpose.

In this present invention I provide mechanism whereby when the mechanism is adjusted to change the extent of the lateral vibration of the needle the extent of the lateral movement of the working position of the point of the needle-thread-loop-engaging device is simultaneously changed to the same extent, thereby keeping their relations the same at their points of loop engagement. To accomplish this, I use a usual needle-bar-actuating lever $a$, Fig. 1, pivoted on a stud $b$ and actuated in the usual manner. This lever a at its stud b is provided in the usual manner with a sleeve c, Fig. 9, extending out on the stud b to form a bearing. On this sleeve I mount an eccentric d and a collar e for keeping it in place. On the needle-bar-actuating lever a I mount an auxiliary lever f, pivoted to turn and slide on the stud g, Figs. 1 and 10. The upper end of this auxiliary lever f encompasses the eccentric d, so as to be actuated on its fulcrum when said eccentric is turned. On said eccentric I mount an arm h, which is circularly adjustable on the same. The lower end of the auxiliary lever f connects in a usual manner with the carrier of the looper L through rod i, Fig. 1. Fastened on the front and on the back of the gooseneck B are plates j, through which extends a bushing k, and through said bushing is passed a shaft l. Eccentrically through this shaft extends a second tubular shaft m, and on the front end of this latter shaft is an upright arm n. Rod o connects said arm with the needle-bar C, and a rod p connects aforesaid arm n with the arm h, mounted on eccentric d. On the end of the second shaft m, Fig. 2, is fastened a second arm q. Through the plates j extends a second bushing r, through which a tubular shaft s, Fig. 1, extends, it being mounted to oscillate. On the end of said shaft s is fastened a lever t, the lower end of which is in engagement with a cam J, fastened to a gear-wheel u, mounted to turn on a stud w. On the upper end of this lever t is an arm 1, placed substantially at right angles to said lever, and in said arm is a curved groove 2, Fig. 11, having therein a shoe 3, provided with a hub. A link 4 is mounted near its upper end to turn on said hub. The lower end of this link 4 is operatively connected with the arm q on the shaft m.

With the mechanism thus far described it is seen (assuming that shaft l is fastened so as not to turn and the link connection 4 is set as in Fig. 2) that if the machine is actuated the needle-bar will be reciprocated vertically and vibrated laterally and that the working position of the point of the looper will be vibrated laterally in unison with the lateral vibrations of the needle.

On the end of the shaft l, Fig. 2, is fastened a circularly-adjustable strap 5. Pivoted on the back plate j, Fig. 2, is a bell-crank lever 6, to the lower arm of which a link 7 is adjustably connected at its upper end. Said link 7 is connected at its lower end to the strap 5. In the upper part of the plates j, Figs. 1 and 2, is mounted shaft 8, and on said shaft and near one end, Fig. 1, is fastened in a usual manner a ratchet-wheel 9. Adjacent to said ratchet-wheel and on same shaft is mounted (in a usual manner) a feed-lever 10, having at its upper end a pawl 11, adapted to engage said ratchet-wheel 9. A rod 12 connects at its upper end with the other end of said feed-lever. The lower end of said rod 12 connects with a crank-pin 13, extending from a disk 14, mounted on the end of an auxiliary shaft 15. A gear 16 is mounted on said shaft and in engagement with gear 17, Fig. 7, said gear being mounted on the driving-shaft 18 of the machine. On the other end of the shaft 8, at the upper part of the machine, Fig. 2, is mounted in a usual manner a cam 19, placed in engagement with a slide 20, Fig. 2, mounted to reciprocate horizontally in a usual manner. One end of said slide is placed in engagement in a usual manner with one end of the lever 6, so as to actuate the same when the slide is reciprocated.

Now if the machine is actuated with adjustments as shown in the drawings it is seen that the needle will be reciprocated vertically and vibrated laterally, and that as the ratchet-wheel 9 is actuated the working position of vibration of the needle will be changed laterally, and that the working position of the point of the looper is also moved laterally in unison with all the lateral movements of the needle.

To automatically increase or decrease the lateral vibration of the needle, I place in engagement with the other end of the slide 20, Fig. 2, a segment-lever 21, pivoted to turn and slide at 22, Fig. 2. Link 23 is (in a usual manner) adjustably connected at one end with said segment-lever and connected at the other end with the upper end of link 4. For taking up the slack thread caused by the lateral movements of the needle, Fig. 1, I fasten rigidly on the upper end of the usual link 24, connecting the needle-bar-actuating lever a with the needle-bar C, an arm 25, in the upper end of which is formed a slot 26. In said slot is adjustably mounted a thread-eyelet 27, Fig. 2. This virtually changes this link connection to a lever, with its fulcrum 28 on the end of the needle-bar lever. As the needle-bar is moved laterally to the left the upper end of this lever is turned to the right. When the needle-bar is moved to the right, its upper end moves to the left, bringing the thread between this lever and the needle-bar into a more vertical position, thereby taking up the slack caused by the return of the needle-bar toward the tension. The amount of action of this lever on the thread can be regulated by adjusting the thread-eyelet 27 in the slot 26. To take up the slack of the under thread caused by the lateral movements of the working position of the looper, I provide a take-up lever 29, Fig. 1, one end of which is in engagement with rod connection p and the other end in engagement with the under thread between the usual take-up device 30 and the looper, Fig. 7. It is seen that all the movements transmitted to the needle-bar to move it laterally are also transmitted to rod p and that therefore when the lateral movements of the needle are increased or decreased the movements of the take-up lever 29 are also increased or decreased. The shaft *l*, Fig. 8, is cut away between its bearings to lighten it and also to provide a cavity between it and its bushing for a substance to hold oil for the shaft *m*, Fig. 8.

The retarding device for the ratchet-wheel 9 to prevent overthrowing of the same, Figs. 1 and 13, consists of a flanged hub 31, attached to the side of said wheel, which is encompassed by an adjustable strap 32, having a usual frictional lining 33. This strap is subjected to the action of a tension-spring 34, tending to turn the ratchet-wheel in the direction reverse to its feed and against a stop-pawl 35. The action is the same as that of the device described in my prior patent, No. 585,225.

I desire it to be understood that I do not wish the application of my invention to be limited to the class of machines herein described, as it is evidently useful in other machines. It is evident that a shuttle may be actuated in a similar manner to move in unison with the lateral movements of the needle.

What I claim as new is—

1. The combination with a sewing-machine having a needle-bar, mechanism constructed to vertically reciprocate and laterally vibrate said needle-bar, mechanism constructed to automaticaly move laterally the working position of the lateral vibration of said needle-bar, and complemental stitch-forming mechanism, of means constructed to move laterally the working position of the point of the looper of the said complemental stitch-forming mechanism in unison with aforesaid lateral vibrations of the needle-bar and in unison with said lateral movements of the working position of the needle-bar, substantially as described.

2. The combination with a sewing-machine having a needle-bar, mechanism constructed to vertically reciprocate and laterally vibrate said needle-bar, mechanism constructed to automatically move laterally the working position of the lateral vibration of said needle-bar, and complemental stitch-forming mechanism, of means constructed to move and vibrate laterally the working position of the point of the looper of the said complemental stitch-forming mechanism in unison with the aforesaid lateral vibrations and movements of the needle-bar, and mechanism constructed to take up the slack thread caused by the said lateral vibrations and movements of the working position of the point of the looper of aforesaid complemental stitch-forming mechanism, substantially as described.

3. The combination with a sewing-machine having a needle-bar gate or frame mounted to swing or vibrate laterally, a needle-bar mounted in said gate or frame, means for vertically reciprocating the needle-bar and complemental stitch-forming mechanism, of a lever, an actuating-cam for the same, an arm extending from said lever and having a curved groove formed therein, a shoe constructed to slide in said groove, a second cam, a ratchet-wheel for actuating the same, a slide actuated by said second cam, an operative connection between said slide and aforesaid shoe whereby the latter is moved in said groove, a shaft mounted transversely to the overhanging arm of the machine, an arm extending from one end of said shaft, operative connections between said arm and aforesaid slide whereby said shaft is oscillated or rocked when said slide is actuated, a second shaft passing eccentrically through the first shaft, an arm on one end of said second shaft, an operative connection between said arm and aforementioned shoe, whereby the latter is vibrated when said shoe is vibrated, a second arm extending from the other end of said second shaft, and an operative connection between said second arm and aforesaid needle-bar gate or frame, whereby the latter is vibrated when said second shaft is oscillated and the working position of vibration is changed laterally when aforesaid first shaft is oscillated, substantially as described.

4. The combination with a sewing-machine having a needle-bar gate or frame mounted to swing or vibrate laterally, a needle-bar mounted in said gate or frame, mechanism constructed to vibrate or swing laterally said needle-bar gate or frame, an actuating needle-bar lever, and complemental stitch-forming mechanism, of a lever *f* actuated by aforesaid needle-bar lever, an operative connection between the said lever *f* and the aforesaid complemental stitch-forming mechanism, whereby the said complemental stitch-forming mechanism is actuated, and a mechanism in operative engagement with aforesaid lever *f*, whereby the working position of the point of the looper is vibrated laterally in unison with the lateral vibrations of the needle-bar, substantially as described.

5. The combination with a sewing-machine having a needle-bar gate or frame mounted to swing or vibrate, a needle-bar mounted in said gate or frame, an actuating-lever, a connection between said actuating-lever and the needle-bar, whereby the latter is vibrated laterally, and an actuating needle-bar lever, whereby aforesaid needle-bar is reciprocated vertically, of a second lever mounted on one end of aforesaid needle-bar lever, an eccentric mounted to turn on the fulcrum of the aforementioned needle-bar lever, a connection between aforesaid actuating-lever and said eccentric, whereby the latter is turned in unison with the lateral vibrations of the needle-bar; the upper end of aforesaid second lever being actuated by the eccentric, whereby said second lever is vibrated on its fulcrum in unison with the lateral movements of aforesaid needle-bar and independent of the action of aforementioned needle-bar-actuating lever, and an operative connection between the lower end of the aforesaid second lever and the looper, whereby the point of the latter is vibrated laterally in unison with the lateral movements of the needle and also reciprocated laterally so as to engage and disengage with the loop of the needle-thread, substantially as described.

In testimony that I claim the foregoing as my invention I have signed my name, in presence of two witnesses, this 8th day of June, 1897.

W. N. PARKES.

Witnesses:
EUGENIE A. PERSIDES,
GEORGE W. EISENBRAUN.